United States Patent
Pawar et al.

(10) Patent No.: US 10,432,368 B1
(45) Date of Patent: Oct. 1, 2019

(54) BALANCING OF TRANSMISSION TIME INTERVAL BUNDLING AND COORDINATE MULTIPOINT

(71) Applicant: Sprint Spectrum L.P., Overland Park, KS (US)

(72) Inventors: Hemanth Pawar, Brambleton, VA (US); Shilpa Kowdley Srinivas, Brambleton, VA (US); Krishna Sitaram, Chantilly, VA (US); Chunmei Liu, Great Falls, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 853 days.

(21) Appl. No.: 14/689,585

(22) Filed: Apr. 17, 2015

(51) Int. Cl.
*H04L 5/00* (2006.01)
*H04W 72/04* (2009.01)

(52) U.S. Cl.
CPC .......... *H04L 5/0035* (2013.01); *H04L 5/0057* (2013.01); *H04W 72/0446* (2013.01)

(58) Field of Classification Search
CPC . H04L 5/0035; H04L 5/0057; H04W 72/0446
See application file for complete search history.

(56) References Cited

U.S. PATENT DOCUMENTS

| | | |
|---|---|---|
| 2003/0161328 A1 | 8/2003 | Chase et al. |
| 2008/0253319 A1 | 10/2008 | Ji et al. |
| 2009/0268707 A1* | 10/2009 | Pani .................. H04L 1/18 370/345 |
| 2012/0088455 A1 | 4/2012 | Love et al. |
| 2012/0282942 A1 | 11/2012 | Uusitalo et al. |
| 2013/0083783 A1 | 4/2013 | Gupta et al. |
| 2013/0114517 A1 | 5/2013 | Blankenship et al. |
| 2013/0343273 A1 | 12/2013 | Barbieri et al. |
| 2014/0056237 A1* | 2/2014 | Eriksson ............... H04L 1/0006 370/329 |
| 2014/0313997 A1* | 10/2014 | Xu ..................... H04W 72/0413 370/329 |
| 2015/0208415 A1* | 7/2015 | Xu .......................... H04L 5/001 370/329 |

(Continued)

FOREIGN PATENT DOCUMENTS

| | | |
|---|---|---|
| EP | 2 385 653 A2 | 11/2011 |
| WO | 13/138779 A1 | 9/2013 |
| WO | 14/062104 A1 | 4/2014 |

OTHER PUBLICATIONS

Irmer et al., "Coordinated Multipoint: Concepts, Performance, and Field Trial Results", IEEE Communications Magazine, 2011, 102-111.

(Continued)

*Primary Examiner* — Mandish K Randhawa

(57) ABSTRACT

In a long term evolution (LTE) network, coordinated multipoint (CoMP) and transmission time interval (TTI) bundling can both help to improve uplink communications, but both can also place a burden on network resource. Further, since both utilize redundancy to improve uplink communications, albeit in different ways, use of CoMP and TTI bundling may be considered unnecessary. Accordingly, example methods and systems are provided that may help to balance the application of TTI bundling and CoMP.

14 Claims, 9 Drawing Sheets

(56) References Cited

U.S. PATENT DOCUMENTS

2016/0165626 A1* 6/2016 Finne ............... H04W 72/1278
370/336

OTHER PUBLICATIONS

The 3G4G Blog: Coordinated Multi-Point (CoMP) transmission and reception, 2010, 14 pages, printed Feb. 26, 2015, http://blog.3g4g.co.uk/2010/02/coordinated-multi-point-comp.html.
Mahalingam, "Coordinated Multipoint Tx and Rx", White Paper Radisys, Radisys Corporation, 2011, 7 pages.
Ghaleb et al., "QoS-Aware Joint Uplink-Downlink Scheduling in FDD LTE-Advanced with Carrier Aggregation", IEEE, 2014, pp. 111-115.
U.S. Appl. No. 14/531,628, filed Nov. 3, 2014.
"Carrier Aggregation—Activation and Deactivation of Secondary Calls," How LTE Stuff Works?, printed from the World Wide Web, dated Oct. 17, 2014.
Co-Pending U.S. Appl. No. 14/447,604 filed Jul. 30, 2014.
Co-Pending U.S. Appl. No. 14/543,465, filed Nov. 17, 2014.
Co-Pending U.S. Appl. No. 14/575,428, filed Dec. 18, 2014.
Co-Pending U.S. Appl. No. 14/575,455, filed Dec. 18, 2014.

* cited by examiner

600

TTI Bundling Modes

| | # of CoMP Links (602a) | Link Reliability (H,M,L) (602b) | TTI Bundling Enable? (602c) | TTI Bundling Size (602d) |
|---|---|---|---|---|
| 604a | 0 | NA | Y | 4 |
| 604b | 1 | L | Y | 4 |
| 604c | 1 | M | Y | 3 |
| 604d | 1 | H | Y | 2 |
| 604e | 2 | L | Y | 3 |
| 604f | 2 | M | Y | 2 |
| 604g | 2 | H | N | NA |
| 604h | 3 | NA | N | NA |

FIG. 6

BALANCING OF TRANSMISSION TIME INTERVAL BUNDLING AND COORDINATE MULTIPOINT

BACKGROUND

In a wireless communication system, a base station may provide one or more coverage areas, such as cells or sectors, in which the base station may serve user equipment devices (UEs), such as cell phones, wirelessly-equipped personal computers or tablets, tracking devices, embedded wireless communication modules, or other devices equipped with wireless communication functionality (whether or not operated by a human user).

In general, each coverage area may operate on one or more carriers each defining one or more ranges of frequency spectrum and having a respective "downlink channel" for carrying communications from the base station to UEs and a respective "uplink channel" for carrying communications from the UEs to the base station. Such carriers may be frequency division duplex (FDD), in which the downlink and uplink channels are defined as separate respective ranges of frequency, or time division duplex (TDD), in which the downlink and uplink channels are defined on a common range of frequency but distinguished through time division multiplexing. Further, the downlink channel and uplink channel of each carrier may also be divided into respective sub-channels for carrying particular communications, such as one or more control channels for carrying control signaling and one or more traffic channels for carrying application-layer data and other traffic.

For instance, in a system operating according to an orthogonal frequency division multiple access (OFDMA) protocol, such as the Long Term Evolution (LTE) standard of the Universal Mobile Telecommunications System (UMTS) for example, the air interface is divided over time into frames and sub-frames each defining two slots, and the uplink and downlink channels are each divided over their frequency bandwidth into sub-carriers that are grouped within each slot into resource blocks. When a UE is positioned within coverage of a base station in such a system, the UE may register or "attach" with the base station on a particular carrier on which the base station is configured to provide, and the base station may then schedule particular downlink and uplink resource blocks on that carrier to carry data communications to and from the UE. Further, the base station and UE may modulate their air interface data communications at a coding rate selected based on quality of the UE's coverage, such as with higher rate coding rate when the UE is in better coverage of the base station and with a lower coding rate when the UE is in worse coverage of the base station.

In such LTE systems, a Hybrid Automatic Repeat Request (HARQ) procedure can be used. According to the HARQ approach, after a transmitting entity has transmitted a block of data, the transmitting entity waits to receive a HARQ response from the receiving entity. If the transmitting entity receives a positive acknowledgement (ACK) as the HARQ response, then no re-transmission is needed and the transmitting entity can transmit additional data. If the transmitting entity receives a negative acknowledgement (NACK) as the HARQ response, then the transmitting entity re-transmits the data. The transmitting entity may also re-transmit the data if the transmitting entity does not receive any HARQ response within a certain period of time.

This re-transmission approach can allow data to be successfully transmitted from a transmitting entity to a receiving entity even when there is a substantial probability that the transmitted data will be received with one or more errors, for example, because of poor radio frequency (RF) conditions. Specifically, the data can be re-transmitted multiple times until the data is received without errors. This re-transmission approach, however, also increases latency. For example, there can be a period of delay between when the transmitting entity transmits data and when the transmitting entity receives a NACK response from the receiving entity and another period of delay between when the transmitting entity receives the NACK response and when the transmitting entity begins re-transmitting the data.

To reduce the delay associated with re-transmitting data, LTE supports a bundling option for data transmissions by a UE in the Physical Uplink Shared Channel (PUSCH). Normally, a UE transmits data in one transmission time interval (TTI), which corresponds to a 1 millisecond (ms) subframe, and then waits to receive a HARQ response before re-transmitting the data or transmitting additional data. However, when TTI bundling is used, the UE transmits the same data in multiple consecutive TTIs (i.e., a "bundle" of TTIs) and then waits to receive a HARQ response. In this way, the UE can transmit multiple instances of the same data, which allows for more robust reception of the data, but without the delay that would be associated with the UE transmitting the data multiple times and waiting for a HARQ response after each transmission.

The number of consecutive TTIs used to transmit the same data for a particular communication before waiting for a HARQ response may be referred to as the "bundling size" of the TTI bundling scheme employed to transmit that communication. Conventional LTE systems typically use TTI bundling with a fixed bundling size of four TTIs. However, other bundling sizes are also possible.

In a further aspect of OFDMA protocols, such as LTE, reception at cell edges may be problematic for various reasons. For example, the greater distance to a base station at a cell edge may result in lower signal strength. Further, at a cell edge, interference levels from neighboring cells are likely to be higher, as the wireless communication device is generally closer to neighboring cells when at a cell edge. Accordingly, serving systems (e.g., LTE networks) may use TTI bundling to improve coverage at a cell edge for uplink communications on a single carrier.

In another effort to improve the quality of service at cell edges, 3GPP LTE-A Release 11 introduced a number of Coordinated Multipoint (CoMP) schemes. By implementing such CoMP schemes, a group or cluster of base stations may improve service at cell edges by coordinating transmission and/or reception in an effort to avoid inter-cell interference, and in some cases, to convert inter-cell interference into a usable signal that actually improves the quality of service that is provided.

LTE-A Release 11 defined a number of different CoMP schemes or modes for both the uplink (UL) and the downlink (DL). For the downlink, two basic types of CoMP modes are set forth: joint processing (JP) schemes and coordinated scheduling/beamforming (CSCH or DL-CSCH) schemes. For the uplink, numerous types of CoMP modes have been devised.

Uplink CoMP modes may involve interference rejection combining (IRC) or coordinated scheduling for purposes of reducing or preventing interference between transmissions from different user entities (UEs). Additionally or alternatively, various uplink CoMP modes may involve "joint reception" and/or "joint processing." Joint reception generally involves multiple base stations receiving an uplink signal that is transmitted by a given UE. Joint processing generally involves the multiple base stations that received the uplink signal from the UE, sending the respectively received signals or a decoded and/or processed version of the respectively received signals to one another, or just to a master base station in the group, such that the multiple received versions of the UE's transmission can be combined to improve reception and/or reduce interference.

Various types of joint processing have been implemented on the uplink. For example, joint processing on the uplink can be centralized. When a centralized CoMP mode is implemented on the uplink, the coordinating base stations may simply pass the entire received signal from a given UE on to a master base station, which then uses the received signals from multiple base stations to decode and/or process the signal from the given UE. Joint processing on the uplink can also be de-centralized to varying degrees. Specifically, when a decentralized CoMP mode is implemented on the uplink, a coordinating base station may decode and/or process the received signal from a given UE, and then send the decoded and/or processed signal from the given UE to the master base station. The master base station can then combine or select from the decoded and/or processed versions of the UE's transmission, which are sent to the master base station from one or more coordinating base stations that receive the UE's signal (and possibly a version of the UE's signal that is received at the master base station itself).

OVERVIEW

Uplink coordinated multipoint (CoMP) and transmission time interval (TTI) bundling can both help to improve reception of uplink signals from UEs by providing data redundancy, albeit in different ways. Thus, if both uplink CoMP and TTI bundling are utilized concurrently, this may be considered duplicative, at least to some degree. Further, utilizing both uplink CoMP and TTI bundling for a particular UE can result in a disproportionate amount of uplink resources being allocated to the particular UE.

Accordingly, the exemplary embodiments described herein may help to balance the application of TTI bundling and uplink CoMP, in an effort to avoid disproportionate allocations of uplink resources and/or for other purposes. For instance, if uplink CoMP is being utilized for uplink communications from a UE, the serving network (e.g., the serving eNodeB) may disable or reduce the bundling size of TTI bundling for the UE. In some embodiments, when uplink CoMP is being utilized for a UE, the eNodeB may vary the TTI bundling size based on how many sectors are coordinating to provide uplink CoMP for the UE. In such embodiments, an eNodeB may reduce the TTI bundling size as the number of sectors coordinating for joint processing of a UE's uplink signal increases, and vice versa.

Further, in some embodiments, the network may alternatively disable or reduce the number of sectors that are utilized for uplink CoMP, based on whether or not TTI bundling is being utilized by a given UE. In such embodiments, when TTI bundling is being utilized by a UE, the network may consider the bundling size, and vary the extent of uplink CoMP according to the bundling size. For example, an eNodeB may reduce the number of sectors that coordinate for joint processing as the TTI bundling size increases, and vice versa. Other examples are possible More generally, an exemplary method may be carried out by a base station (e.g., an eNodeB) that is serving a UE. The method may involve the base station: (a) determining an uplink CoMP status of the UE, (b) based at least in part on the uplink CoMP status of the UE, selecting a TTI-bundling mode from a plurality of TTI-bundling modes, and (c) receiving an uplink communication from the UE according to the selected TTI-bundling mode.

In a further aspect, another exemplary method may also be carried out by a base station (e.g., an eNodeB) that is serving a UE. The method may involve the base station: (a) determining a TTI bundling status for the UE, (b) based at least in part on the TTI bundling status, selecting, by the base station, an CoMP mode from a plurality of uplink CoMP modes; and (c) processing uplink communications from the UE according to the selected uplink CoMP mode.

In yet another aspect, a system is disclosed that is configured to provide service in one or more sectors of a wireless communication network. The system includes: (i) a communication interface configured to receive an uplink signal from a UE in a first sector of the wireless communication network, (ii) at least one processor, and (iii) program instructions stored on a non-transitory computer readable medium and executable by the at least one processor to: (a) determine an uplink coordinated multipoint (CoMP) status of the UE, (b) based at least in part on the uplink CoMP status of the UE, select a TTI-bundling mode from a plurality of TTI-bundling modes, and (c) operate the communication interface to receive an uplink signal from the UE according to the selected TTI-bundling mode.

These as well as other aspects, advantages, and alternatives, will become apparent to those of ordinary skill in the art by reading the following detailed description, with reference where appropriate to the accompanying drawing

BRIEF DESCRIPTION OF THE DRAWINGS

An exemplary embodiment of the present invention is described herein with reference to the drawings, in which:

FIG. 6 is a table showing a scheme for selecting a TTI bundling mode based on a combination of the number of CoMP links that are coordinating to provide joint processing of a UE's signal and the link reliability indicator, according to an exemplary embodiment.

DETAILED DESCRIPTION

Exemplary embodiments of the present invention are described herein. It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

Further, methods and systems may be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

I. EXEMPLARY NETWORK ARCHITECTURE

Figure 1A:
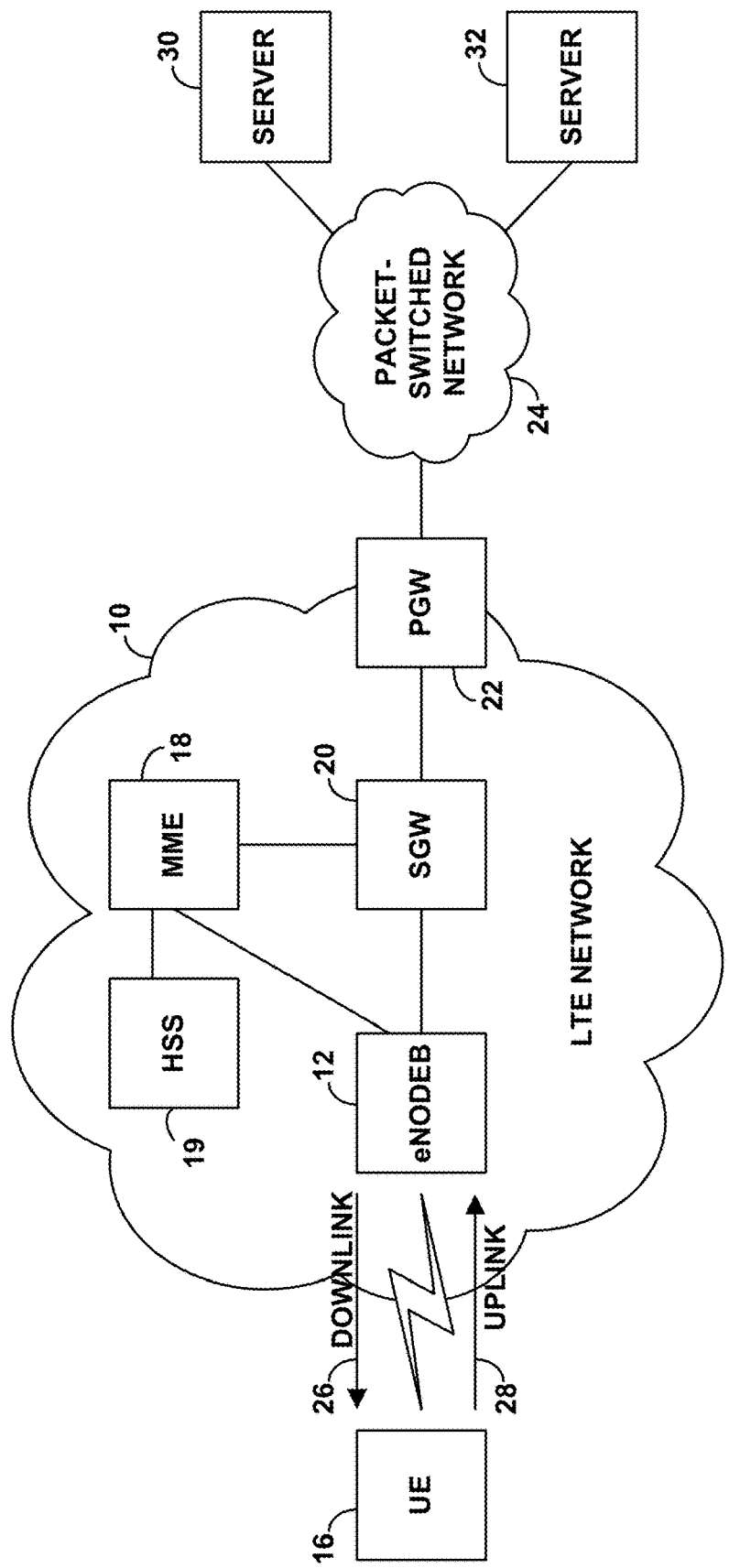
FIG. 1A is a simplified block diagram of a wireless communication system in which the present method and system can be implemented.

Referring to the drawings, FIG. 1A is a simplified block diagram of a wireless communication system in which the present method and system can be implemented. In particular, FIG. 1A depicts a representative LTE network 10, which functions primarily to serve UEs with wireless packet data communication service, including possibly voice-over-packet service, but may also provide other functions. As shown, the LTE network 10 includes a base station (eNodeB) 12, which has one or more antenna structures and associated equipment for providing one or more LTE coverage areas in which to serve UEs such as an example UE 16 as shown.

The eNodeB 12 has a communication interface with a mobility management entity (MME) 18 that functions as a signaling controller for the LTE network 10. Further, the eNodeB 12 has a communication interface with a serving gateway (SGW) 20. MME 18 may be communicatively coupled to a home subscriber server (HSS) 19, which stores subscriber information, and may also be communicatively coupled to the SGW 20. SGW 20 in turn has a communication interface with a packet-data network gateway (PGW) 22, which may provide connectivity with a packet-switched network 24. In practice, the illustrated components of the LTE network 10 may sit as nodes on a private packet-switched network owned by an operator of the LTE network 10, and thus the various communication interfaces may be logical interfaces through that network.

As illustrated, the air interface for a given sector served by eNodeB 12 may have a downlink direction 26 from the eNodeB 12 to the UE 16, and an uplink direction 28 from the UE 16 to the eNodeB 12. Further, the eNodeB 12 and the UE 16 may be configured (e.g., licensed and programmed) to support air interface communication on various particular carriers, which may be FDD or TDD, for example. Each such carrier and/or its particular downlink and uplink channels may be identified by one or more globally unique identifiers per industry standard, so that the eNodeB 12 and a served UE can refer to particular carriers by those identifiers.

According to LTE, each carrier's downlink channel may then define various sub-channels, such as a physical downlink control channel (PDCCH) for carrying scheduling directives and other control signaling from the eNodeB 12 to UEs, a physical downlink shared channel (PDSCH) for carrying scheduled downlink data communication, and a reference channel for carrying a reference signal that UEs can monitor to evaluate coverage quality. Likewise, each carrier's uplink channel may define various sub-channels, such as a physical uplink control channel (PUCCH) for carrying scheduling requests and other control signaling from the UEs to the eNodeB 12 and a physical uplink shared channel (PUSCH) for carrying scheduled uplink data communication.

With this arrangement, when the UE 16 enters into coverage of the eNodeB 12, the UE 16 may detect the eNodeB's 12 coverage on a particular carrier, and the UE 16 may engage in an attach process or handover process to register with the LTE network 10 on that carrier. For instance, the UE 16 may initially transmit to the eNodeB 12 an attach request, which the eNodeB 12 may pass along to the MME 18, triggering a process of authenticating the UE 16 and establishment of one or more logical bearer connections for the UE 16 between the eNodeB 12 and the PGW 22.

Further, the UE 16 may engage in signaling with the eNodeB 12 to establish a radio-link-layer connection (i.e., air interface connection) on the detected carrier, so that the eNodeB 12 may then serve the UE 16 on that carrier. For instance, the UE 16 and the eNodeB 12 may exchange radio resource control RRC configuration messaging to prepare the eNodeB 12 to serve the UE 16 on the carrier and to prepare the UE 16 to be served on the carrier. In this process, the eNodeB 12 may store a context record for the UE 16, indicating that the eNodeB 12 is serving the UE 16 on the particular carrier, so that the eNodeB 12 may then serve the UE 16 on the indicated carrier (e.g., then exchanging control signaling and bearer traffic with the UE 16 on that carrier) per that context record. Further, the UE 16 may store a context record indicating that the UE 16 is being served on that carrier, so that the UE 16 can then be served on that carrier (e.g., then exchanging control signaling and bearer traffic with the eNodeB 12 on that carrier) per that context record. As such, the radio-link-layer connection could be considered to effectively encompass initially just that one carrier.

II. COORDINATED MULTIPOINT

As noted above, a network such as communication network 10 may implement various types of coordinated multipoint (CoMP) service, through which base stations (e.g., eNodeBs) may coordinate to improve uplink and/or downlink service. CoMP schemes designed for coordinated transmission by base stations may be referred to as downlink CoMP modes, while CoMP schemes designed for coordinated reception may be referred to as uplink CoMP modes.

Figure 1B:
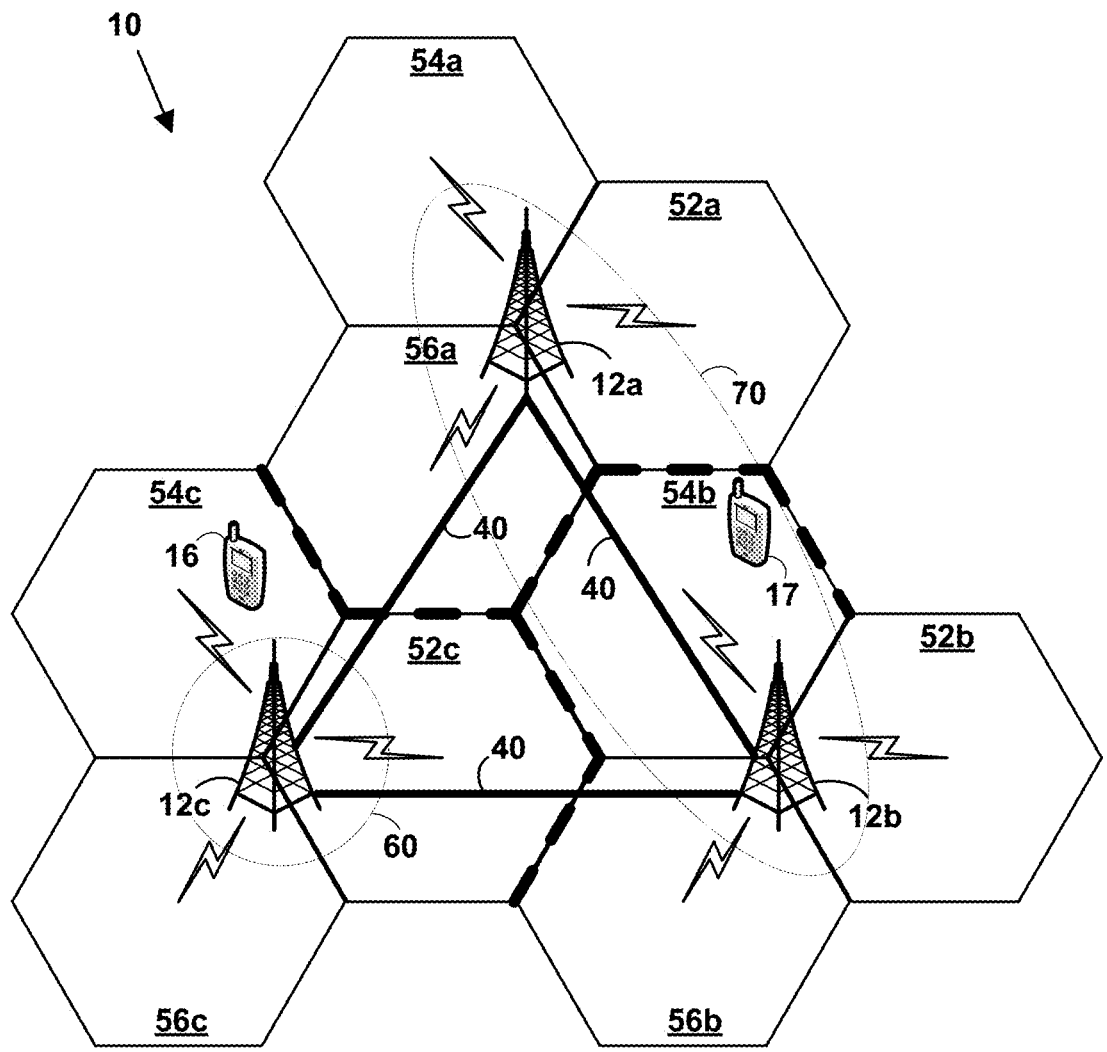
FIG. 1B is a simplified block diagram illustrating a portion of communication network in which CoMP schemes may be implemented.

FIG. 1B is a simplified block diagram illustrating a portion of communication network 10 in which CoMP schemes may be implemented for uplink and/or downlink communications. In particular, FIG. 1B shows a portion of an LTE network, which includes three eNodeBs 12a to 12c. More or less eNodeBs, and/or other types of access points or base transceiver stations, are also possible. As shown, eNodeB 12a is serving three coverage areas or sectors 52a, 54a, and 56a, eNodeB 12b is serving three coverage areas or sectors 52b, 54b, and 56b, and eNodeB 12c is serving three coverage areas or sectors 52c, 54c, and 56c. Further, a UE 16 is operating in sector 54c, which is served by eNodeB 12c. Further, while not shown in FIG. 1B, each eNodeB 12a to 12c may be configured in the same or in a similar manner as the eNodeB 12 shown in FIG. 1A. For instance, each eNodeB 12a to 12c may be communicatively coupled to an MME and/or an SGW. Further, note that some or all of eNodeBs 12a to 12c may be communicatively coupled to the same MME and/or the same SGW. Alternatively, each eNodeB 12a to 12c might be connected to a different MME and/or different SGW.

In some cases, uplink CoMP may be implemented by a single base station, which provides service in multiple sectors. This type of CoMP scheme may be referred to as an "intra base station" or "intra-eNodeB" CoMP scheme. For example, eNodeB 12c may provide uplink CoMP by utilizing and/or combining uplink signals from a UE that are received at two or more of the sectors 52c, 54c, and 56c that are served by eNodeB 12c. In particular, eNodeB 12c may define a CoMP group 60 to include all its sectors 52c, 54c, and 56c. As such, eNodeB 12c may adaptively use joint processing techniques and/or interference rejection combining (IRC) techniques when the uplink signal from UE 16 is received at two or more of the sectors 52c, 54c, and 56c that it serves.

In other cases, uplink CoMP may be implemented by multiple base stations, which may each provide service in multiple sectors or only in one cell. This type of CoMP scheme may be referred to as an "inter base station" or "inter-eNodeB" CoMP scheme. For example, eNodeBs 12a and 12c may provide uplink CoMP by utilizing and/or combining uplink signals from UE 17 that are received at two or more of the sectors 52a, 54a, 56a, 52b, 54b, and 56b that are served by eNodeBs 12a and 12b. (Those skilled in the art will understand that in the context of CoMP the "uplink signals" received at different base stations result from the same uplink signal that is transmitted by the UE, but are different because the transmission is "perceived" differently in the different sectors.)

When uplink CoMP involves multiple base stations (e.g., inter-base station CoMP), a the base stations may coordinate with one another via a backhaul network, which allows for communications between base stations and/or other network components. For example, in an LTE network, eNodeBs may communicate via links that are referred to as X2 interfaces. X2 is described generally in Technical Specification ETSI TS 136 420 for LTE; Evolved Universal Terrestrial Radio Access Network (E-UTRAN); X2 general aspects and principles. In FIG. 1B, eNodeBs 12a to 12c are communicatively connected via X2 links 40. It should be understood, however, that other types of backhaul communications are also possible.

In both intra-eNodeB and inter-eNodeB CoMP, there may be pre-defined groups of sectors, which may be referred to herein as "CoMP groups" or "CoMP clusters." The eNodeB or eNodeBs that serve the sectors in a CoMP group are configured to provide uplink CoMP using some or all of the sectors in the group.

Further, the coordinating eNodeB may determine which sectors from the CoMP group should be used to provide uplink CoMP for a given UE, at a given point in time. In particular, the coordinating eNodeB may determine a subset of the CoMP group that should be utilized for a given UE, based on various factors. Possible factors include, but are not limited to, whether or not a signal from the given UE is received in a candidate sector, signal strength and/or other air interface conditions in the candidate sector, and/or processing load at the eNodeB serving the candidate sector, among other possibilities. In the case of intra-eNodeB uplink CoMP, this process of the eNodeB selecting a subset of sectors from the sectors in its uplink CoMP group to provide uplink CoMP for a particular UE may be referred to as "adaptive sector selection."

In a further aspect, various types of uplink CoMP modes are possible. Further, as will be explained below, different uplink CoMP modes may have differing effects on the CPU load of the master base station and/or on the CPU load(s) at the other base station(s) with which the master base station coordinates to implement uplink CoMP. As will also be explained below, the uplink CoMP modes may additionally or alternatively have different effects on the backhaul network.

An interference rejection combining (IRC) mode may be used to reduce or cancel interference at a receiving base station (e.g., the master eNodeB in an inter-eNodeB CoMP cluster), or in the receiving sector, in the case of intra-eNodeB CoMP. When only IRC is implemented, there is very little coordination required between the base stations an inter-eNodeB CoMP group. Therefore, in the case of inter-base-station uplink CoMP, IRC-only does not significantly increase the CPU load at a coordinating base station, or increase the load on the backhaul network (e.g., on X2 links between base stations).

Some uplink CoMP schemes may use joint scheduling (also referred to as coordinated scheduling) in order to, e.g., reduce interference. When joint scheduling is implemented, only one UE at a time transmits the physical uplink shared channel (PUSCH) on a given resource block (RB), and the base stations coordinate to schedule the transmission. If only joint scheduling, then the load on the backhaul network (e.g., X2 links between base stations in an inter-eNodeB CoMP group) may be reduced significantly, because joint scheduling typically only requires that base stations exchange scheduling data.

When joint reception is implemented, multiple UEs can simultaneously transmit on the PUSCH, and may use the same RB when doing so. The PUSCHs may be received in multiple sectors, and in the case of inter-eNodeB CoMP, by multiple eNodeBs. The PUSCHs received in different sectors may be combined using various joint processing techniques, such as a mean squared error (MMSE) or zero forcing (ZF) process. Further, joint reception and joint processing may be combined with other types of uplink CoMP techniques, such as IRC, adaptive antennas, and/or multi-user detection schemes, in an effort to further improve performance and/or for other reasons.

In a further aspect, CoMP modes that include joint processing may be centralized or decentralized to varying degrees. Specifically, in the context of inter base station CoMP, the extent to which a coordinating base station decodes and/or processes a received signal, before sending to the master base station, may vary in different CoMP modes. Since different CoMP modes can increase or decrease in the amount of decoding and/or processing that is done by the coordinating base station, different CoMP modes can in turn increase or decrease the CPU load of the coordinating base station, respectively. Further, increasing the amount of decoding and/or processing that is performed by the coordinating base station may result in less data that is transferred over the backhaul network (e.g., over an X2 link) to the master base station. Specifically, less data may be transferred because, e.g., the size of the decoded signal may be less than the size of the received signal.

As an example, a first type of joint processing may involve a coordinating eNodeB sending the master eNodeB the received signal via an X2 interface, without having decoded the received signal. Specifically, coordinating eNodeB may send raw I/Q data to the master eNodeB via an X2 interface between these two eNodeBs. The raw I/Q data may include all the physical layer bits received by the eNodeB. This first type of joint processing may be referred to herein as "centralized" joint processing.

A second type of joint processing may involve a coordinating eNodeB decoding a received signal before sending it to the master eNodeB. For example, the decoding process may involve the coordinating eNodeB may extracting user data (e.g., packet data) from the physical layer bits in the received signal, such as by removing phase information represented by I/Q bits in the received signal, and/or removing other non-user data from the received signal. The master eNodeB may then compare the decoded signal received from the coordinating eNodeB to its own decoded signal (and possibly decoded signals received from other coordinating eNodeBs) and select the best decoded signal. Alternatively, the master eNodeB may combine the decoded signal from a UE that is received from a coordinating eNodeB with its own the decoded signal from the UE, and/or with one or more other versions of the decoded signal from the UE that are received from other coordinating eNodeBs, in order to generate a combined signal for the particular UE.

This second type of joint processing may be referred to herein as "decentralized" joint processing. It should be understood that varying degrees of decentralized joint processing are possible. That is, the amount of decoding and processing may vary. For example, decentralized joint processing could simply involve decoding the received signal before sending it to the master base station. However, joint processing could further involve compressing the decoded signal before sending it to the master base station (which could help to reduce the load on the backhaul links). Other examples are also possible.

As noted above, decentralized joint processing may reduce the size of the received signal before it is sent to the master base station. Therefore, while decentralized joint processing may increase the CPU load at the coordinating base stations, it can decrease the load on the backhaul link between the coordinating base station and the master base station.

In a further aspect, it should be understood that the above descriptions of joint processing that utilizes signals received and communicated between eNodeBs, can be classified as inter-eNodeB uplink CoMP. The same concepts may be applied in the context of intra-eNodeB joint processing, with the difference being that a single eNodeB will use uplink signals received in two or more sectors it serves for joint processing, instead of using signals sent to the eNodeB by other eNodeBs.

III. TTI BUNDLING

Figure 2A:
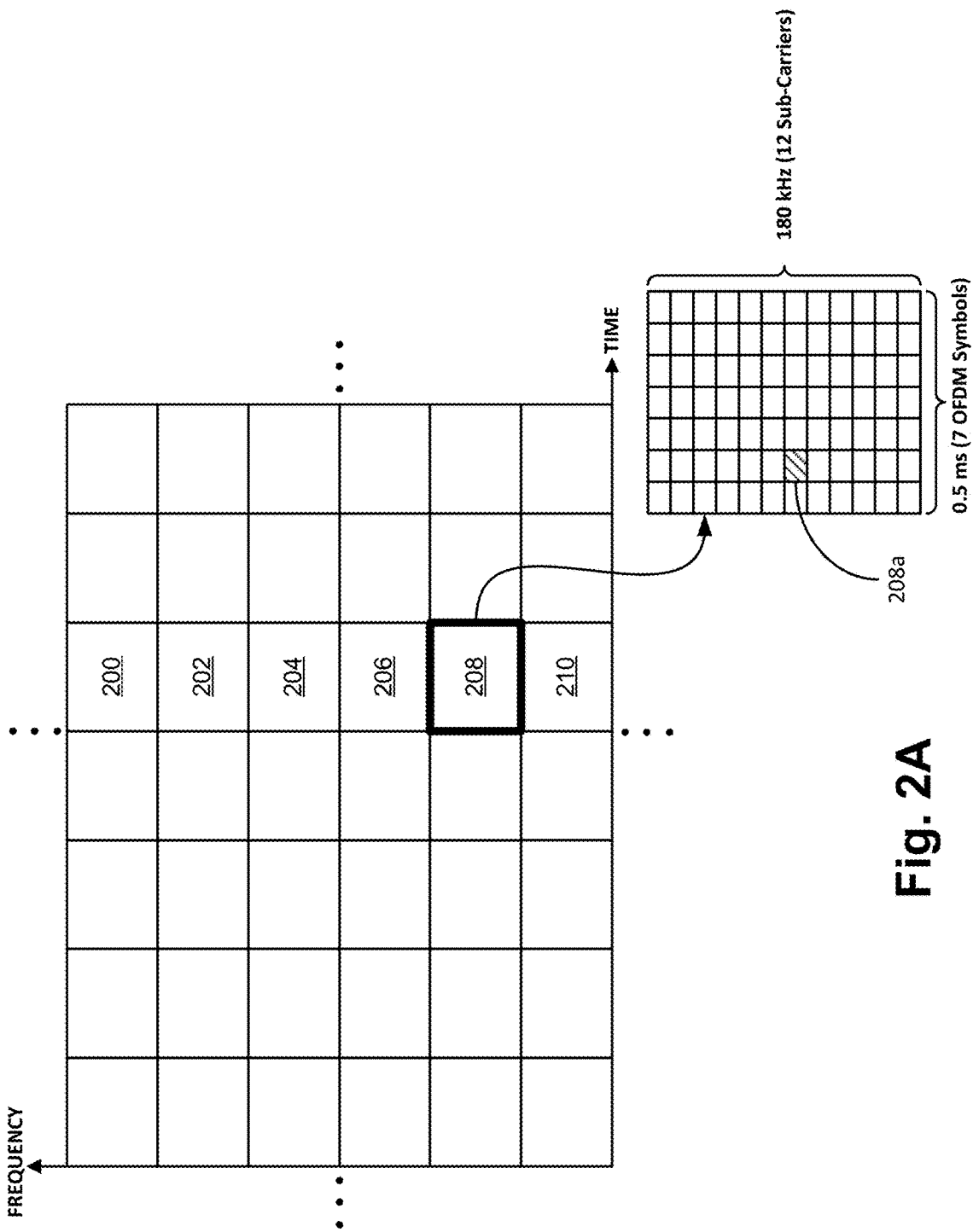
FIG. 2A illustrates an exemplary division of the uplink resources in a given wireless coverage area into resource blocks.

As noted above, portions of the PUSCH may be allocated to particular UEs by allocating resource blocks. FIG. 2A illustrates how the uplink resources in a given wireless coverage area may be divided in time and frequency domains into resource blocks. In an LTE air interface, data is transmitted on both the uplink and the downlink in the form of orthogonal frequency division multiplexing (OFDM) symbols. Each OFDM symbol is formed from a plurality of sub-carriers, typically 12 sub-carriers, each with a bandwidth of 15 kHz. Thus, a resource block corresponds to a plurality of sub-carriers that are used to form an OFDM symbol and has a duration that can accommodate a particular number of OFDM symbols (e.g., seven OFDM symbols).

In the time domain, each resource block typically occupies a 0.5 ms slot of time. By way of example, FIG. 2A shows resource blocks 200 to 210 for a particular slot. In the frequency domain, each of resource blocks 200 to 210 occupies a respective portion of frequency bandwidth, typically 180 kHz in LTE implementations. Although FIG. 2A shows six resource blocks in each slot, a wireless coverage area could have a greater number of resource blocks, as indicated by the dots above and below resource blocks 200 to 210.

FIG. 2A also includes a more detailed view of uplink resource block 208. This detailed view shows that the 180 kHz of frequency bandwidth corresponds to 12 sub-carriers of 15 kHz each. Further, in this example, the 0.5 ms slot of time corresponds to the duration of seven OFDM symbols. In other examples, a 0.5 ms slot could correspond to a different number of OFDM symbols. Thus, a resource block may be described as a set of resource elements, with each resource element corresponding to one modulated sub-carrier in an OFDM symbol. The detailed view of uplink resource block 208 in FIG. 2A shows the division of the resource block into multiple resource elements, such as resource element 208a.

Figure 2B:
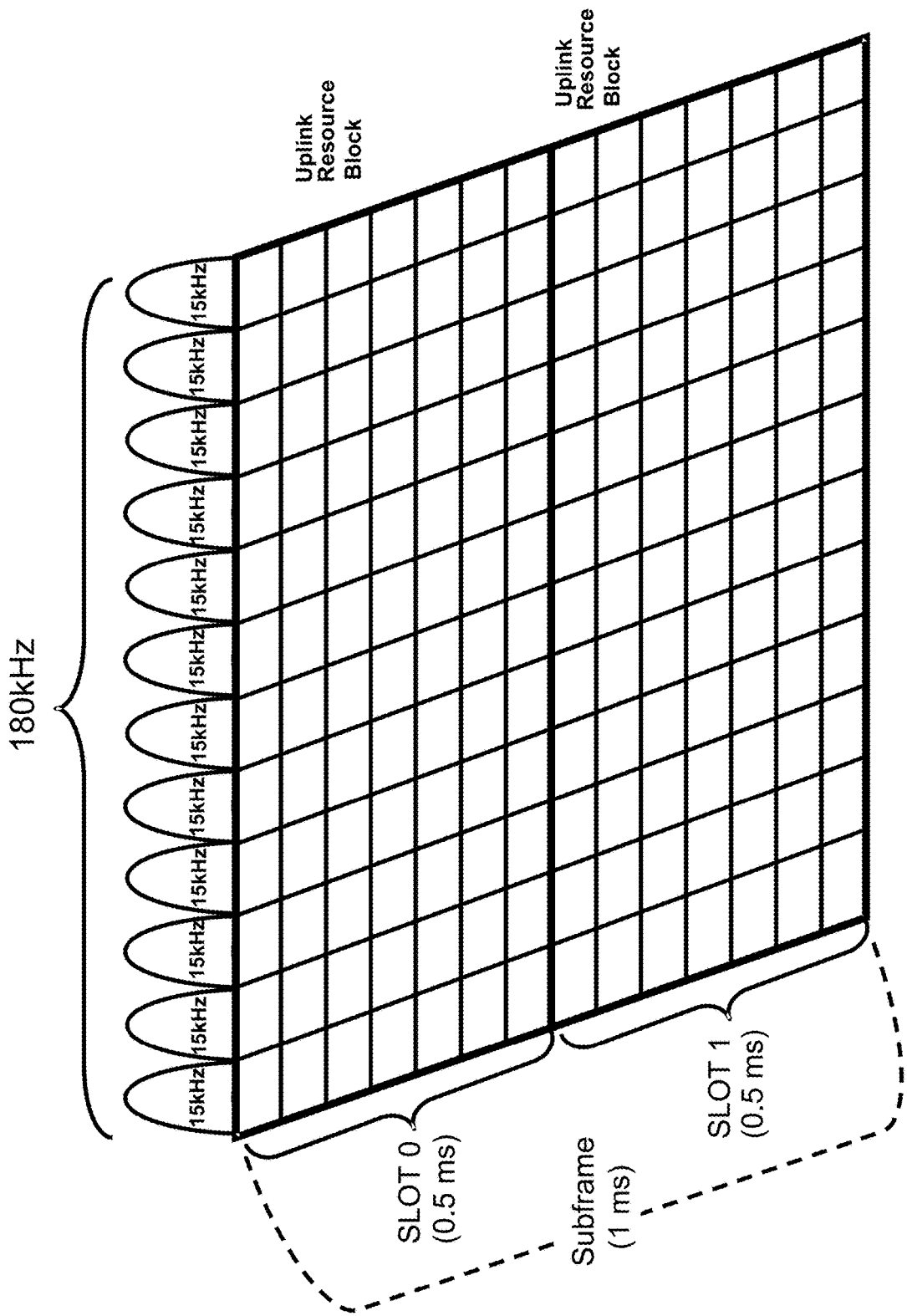
FIG. 2B illustrates an uplink resource allocation for a user equipment that is maintained for two consecutive slots of time in a given subframe.

A resource block may be allocated to a particular UE to transmit data in the uplink shared channel (PUSCH channel). For example, resource blocks 200 and 202 might be allocated to UE 16, resource blocks 204 to 208 might be allocated to UE 17, and resource block 210 might be allocated to another UE (not shown). The allocation of resource blocks to UEs could be made by communication network 10 (e.g., by an eNodeB 12). Further, resource blocks could be allocated to UEs based on the power headrooms reported by the UEs. LTE network 10 may periodically evaluate, and potentially adjust, the allocation of resource blocks to WCDs. This evaluation may occur every subframe, wherein a subframe consists of two consecutive slots (i.e., a subframe is a 1 ms period of time). Thus, when a UE is allocated one or more resource blocks, that allocation may be maintained throughout a subframe (two consecutive slots). In subsequent subframes, the UE may be allocated a different number of resource blocks. FIG. 2B illustrates an uplink resource allocation for a UE that is maintained for two consecutive slots of time (Slot 0 and Slot 1) in a given subframe.

The two consecutive slots of time (Slot 0 and Slot 1) are treated as a transmission time interval (TTI) for purposes of LTE's HARQ process. Without TTI bundling, after a UE has transmitted its data in one TTI, such as shown in FIG. 2B, the UE waits to receive a HARQ response from the RAN (in the PHICH channel) to determine whether the data should be re-transmitted or whether the WCD can transmit additional data. If the HARQ response is an ACK, indicating that the data was successfully received, then the UE can transmit additional data. If the HARQ response is a NACK, indicating that the data was received with one or more errors, then the UE re-transmits the data. The UE may also re-transmit the data if the UE does not receive a HARQ response within a predetermined period of time.

On the other hand, if a UE has been instructed to use TTI bundling for uplink communications, then the UE may transmit the same data to communication network 10 in multiple, consecutive TTIs before waiting for a HARQ response. Similarly, when communication network 10 applies TTI bundling on the downlink, the communication network 10 may transmit the same data in multiple, consecutive TTIs to the UE before waiting for a HARQ response.

IV. EXEMPLARY NETWORK COMPONENTS

Figure 3:
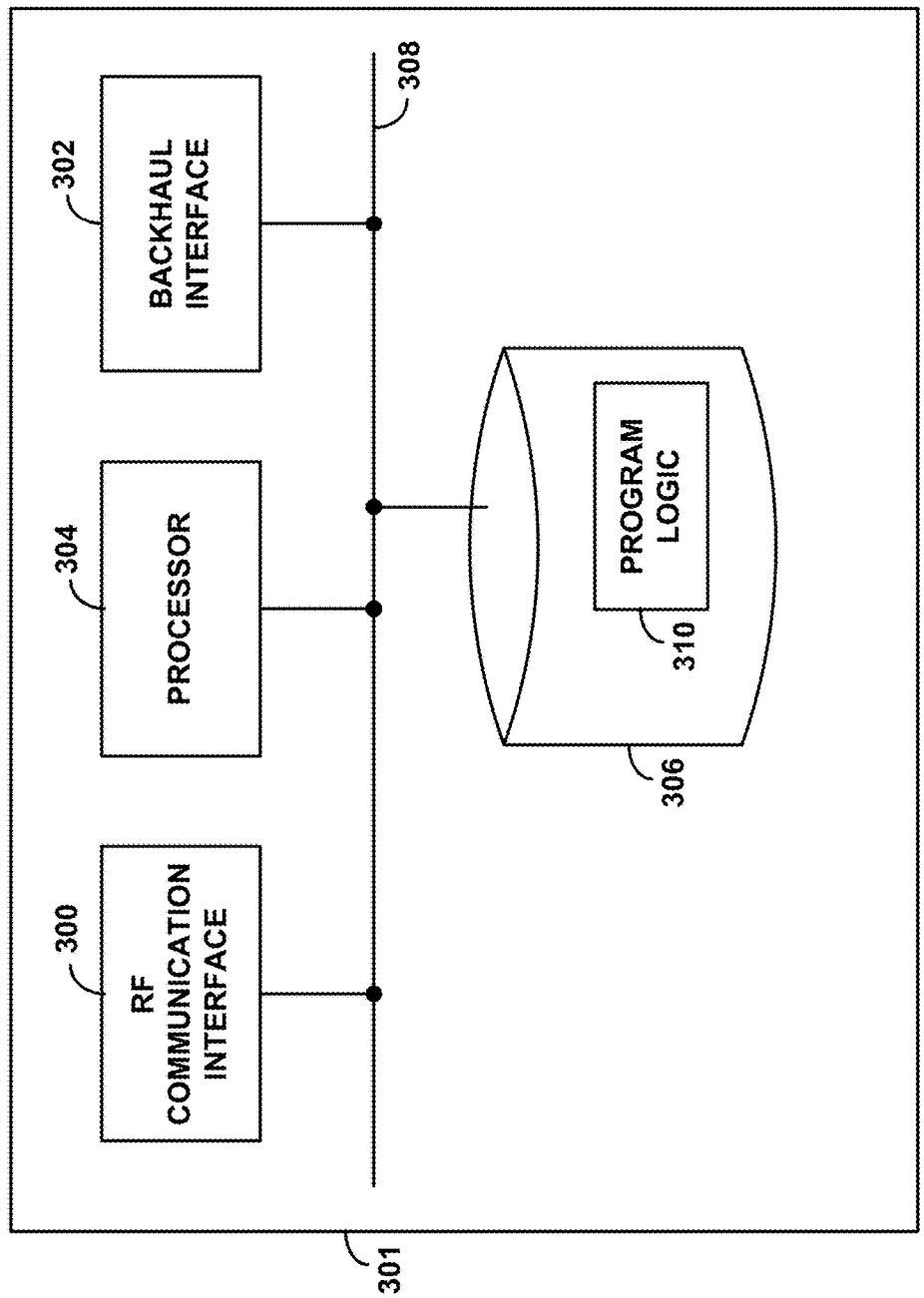
FIG. 3 is a simplified block diagram exemplifying a network component, according to an exemplary embodiment.

FIG. 3 is a simplified block diagram exemplifying a network component, according to an exemplary embodiment. In particular, FIG. 3 illustrates functional components that might be found in a network component 301 that is arranged to operate in accordance with the embodiments herein. As shown, the network component 301 may include a communication interface 300, a backhaul interface 302, a processor 304, and data storage 306, all of which may be communicatively linked together by a system bus, network, or one or more other connection mechanisms 308.

In practice, network component 301 may take the form of an eNodeB, or may take the form of another component of an LTE or CDMA network. Further, the illustrated components of network component 301 (e.g., communication interface 300, a backhaul interface 302, a processor 304, and/or data storage 306) may be distributed and/or subdivided between one or more entities in an LTE network and/or in a CDMA network. It should be understood that an exemplary system may also take the form of another network entity or combinations of other network entities, without departing from the scope of the invention.

In network component 301, communication interface 300 may comprise one or more or wired or wireless communication interfaces and/or other associated equipment for engaging in communications with other network entities and/or for engaging in RF communications with mobile stations according to one or more air interface protocols. Backhaul interface 302 may comprise any sort of communication link or mechanism enabling the network component 301 to exchange signaling and bearer data with other network entities, such as an X2 link, for instance. Further, processor 304 may comprise one or more processors (e.g., general purpose and/or special purpose processors), such as microprocessors for instance.

Data storage 306 may be a non-transitory computer readable medium. For example, data storage 306 may take the form of one or more volatile and/or non-volatile storage components, such as magnetic, optical, or organic storage components, integrated in whole or in part with processor 304. As further shown, data storage 306 contains program logic 310 (e.g., machine language instructions) executable by processor 304 to carry out various functions, such as the functionality of the exemplary methods and systems described herein.

In an exemplary embodiment, communication interfaces 300 may include at least program instructions stored in data storage 306, which are executable by processor 304 to: (a) determine an uplink coordinated multipoint (CoMP) status of the UE, (b) based at least in part on the uplink CoMP status of the UE, select a TTI-bundling mode from a plurality of TTI-bundling modes, and (c) operate the communication interface to receive an uplink signal from the UE according to the selected TTI-bundling mode.

V. EXEMPLARY METHODS

A. Adjusting TTI Bundling Based on Uplink CoMP Status

Figure 4:
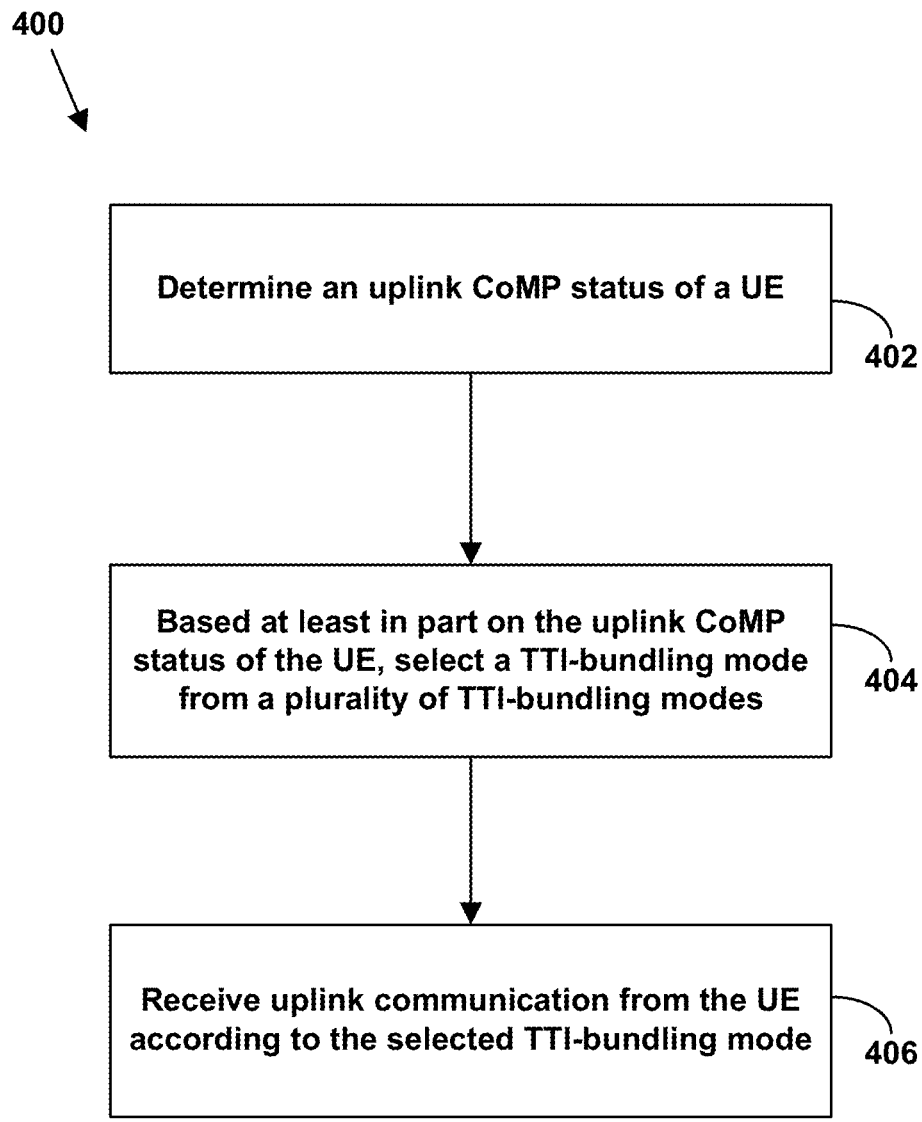
FIG. 4 is flow chart illustrating a method, according to an exemplary embodiment.

As noted above, exemplary methods may help to dynamically balance and adjust uplink TTI bundling and uplink CoMP. FIG. 4 is flow chart illustrating a method 400, according to an exemplary embodiment. Exemplary methods such as method 400 may be implemented by an eNodeB, such as eNodeB 12, and/or by one or more other network entities. Further, other types of base stations and/or network entities, operable to provide service under protocols other than LTE, may also implement exemplary methods. For simplicity, however, exemplary methods may be described herein as being implemented by an eNodeB. Further, method 400 may be implemented for purposes other than those described herein, without departing from the scope of the invention.

As shown in block 402, method 400 involves an eNodeB determining an uplink CoMP status of a UE that is served by the eNodeB. Based at least in part on the uplink CoMP status of the UE, the eNodeB selects a TTI-bundling mode from a plurality of TTI-bundling modes, as shown by block 404. The eNodeB may then receive uplink communication from the UE according to the selected TTI-bundling mode, as shown by block 406.

Note that before receiving the uplink communication according to the selected to TTI-bundling mode, an exemplary method may further involve the eNodeB sending an indication of the selected TTI-bundling mode to the UE. The indication may take the form of a message that indicates whether TTI bundling is disabled or enabled, and if enabled, the bundling size that should be used by the UE. Note that existing LTE standards provide mechanisms for indicating whether or not TTI bundling is enabled or disabled. However, additional signaling formats may be added to standard LTE in order to allow for the eNodeB to determine and indicate bundling size. For example, an indication of bundling size may be included in a SIB message. The indication may take other forms as well.

Referring back to block 402, various CoMP statuses are possible. For example, in some implementations, the eNodeB may determine whether or not the UE is configured for uplink CoMP. In other implementations, the eNodeB may determine the uplink CoMP status of the UE by determining whether or not uplink CoMP is being utilized for uplink communication with the UE; or in other words whether uplink CoMP is actually being used or is about to be used to receive and/or process uplink communications from the UE. Further, in cases where uplink CoMP is being provided for the UE, the determined CoMP status may include one or more uplink CoMP parameters. For example, the eNodeB may determine the number of sectors that are currently being utilized to provide uplink CoMP for the UE. Other types of uplink CoMP parameters may also determined as part of the CoMP status of a UE.

Various types of TTI-bundling modes may be selected at block 404. For example, the eNodeB could determine that TTI bundling should be disabled altogether. Alternatively, the eNodeB could determine that TTI bundling should be enabled. Further, when TTI bundling is enabled, the eNodeB could determine the appropriate TTI bundling size for the UE based at least in part on the uplink CoMP status of the UE. In such case, the selected TTI-bundling mode may include (a) an indication that TTI bundling is enabled and (b) an indication of the bundling size.

Further, as noted above, the selection of the TTI-bundling mode at block 404 may be based upon the CoMP status of the UE. For example, in order to select an uplink TTI-bundling mode for use by the UE, the eNodeB may initially determine whether or not the uplink CoMP status indicates that uplink CoMP is associated with the UE (e.g., whether or not the UE is configured for and/or whether or not uplink CoMP is currently being utilized for the UE). If the UE's uplink CoMP status indicates that uplink CoMP is associated with the UE, then the eNodeB may responsively disable TTI bundling for uplink communications with the UE. On the other hand, if the UE's uplink CoMP status indicates that uplink CoMP is not associated with the UE, then the eNodeB may responsively enable TTI bundling for uplink communications with the UE.

In some embodiments, the selection of the uplink TTI-bundling mode may simply be a determination as to whether TTI bundling should be enabled or disabled (e.g., whether it should or should not be utilized for uplink transmissions by the UE). In such embodiments, there may be as few as two possible TTI-bundling modes; for instance, a "TTI-bundling enabled" mode and a "TTI-bundling disabled" mode. Further, there may be a default TTI bundling size in such embodiments. For instance, if TTI bundling is enabled, then the UE may always use a TTI bundling size of four. Of course, other default bundling sizes are possible.

In other embodiments, there may be two or more TTI bundling modes in which TTI bundling is enabled, in addition to at least one mode where TTI bundling is disabled. The two or more modes where bundling is enabled may specify different bundling sizes. In such embodiments, the eNodeB may determine one or more uplink CoMP parameters for the UE, and use the determined uplink CoMP parameters as a basis for selecting the TTI bundling mode for the UE.

Various uplink CoMP parameters, or combinations of uplink CoMP parameters, may be used to select the TTI bundling mode for a UE. For instance, as noted above, the eNodeB may determine the number of sectors that are currently being utilized to provide uplink CoMP for the UE. To do so, the eNodeB, which is preferably the primary or coordinating eNodeB in the CoMP group serving the UE, may determine how many "participating sectors" are providing signals that are actually being used by the primary eNodeB for joint processing of the UE's uplink signal. In an exemplary embodiment, the number of participating sectors may be based upon the number of secondary sectors that are receiving an uplink signal from the UE that is actually being used by the primary eNodeB (e.g., excluding sectors from the CoMP group that do not receive a signal from the UE and/or that are not selected as part of an adaptive sector selection process). For example, the eNodeB may calculate the number of participating sectors as the number of secondary sectors being utilized for joint processing, or as the total number of sectors (i.e., secondary and primary) being utilized for joint processing. Additionally or alternatively, the eNodeB may determine how many participating sectors are actively participating in joint reception of the uplink signal from the eNodeB, and use this number as an uplink CoMP parameter. Other uplink CoMP parameters may also be considered.

In using specific uplink CoMP parameters to select the TTI bundling mode, the eNodeB may make an effort to increase the bundling size as the extent of the redundancy provided by uplink CoMP decreases. As an example, when the UE's uplink CoMP status indicates that uplink CoMP is being provided for the UE, the eNodeB may determine how many sectors are currently being utilized to provide uplink CoMP for the UE (e.g., the number of sectors coordinating for joint processing of the UE's uplink signal), and use this number of sectors as a basis for determining the TTI bundling mode. For instance, if the eNodeB determines that joint processing of the UE's uplink signal is utilizing signals received in three sectors, the eNodeB may disable TTI bundling. Further, if the eNodeB determines that joint processing of the UE's uplink signal involves signals received in two sectors, the eNodeB may enable TTI bundling with the bundling size set equal to 2 slots. And, when the UE's uplink CoMP status indicates that uplink CoMP is not currently being provided (e.g., when uplink CoMP is disabled or is not being utilized because the UE's uplink signal is only detected in one sector in the CoMP group), the eNodeB may enable TTI bundling with a maximum bundling size (e.g., 4 slots). Other examples are also possible.

Figure 5:
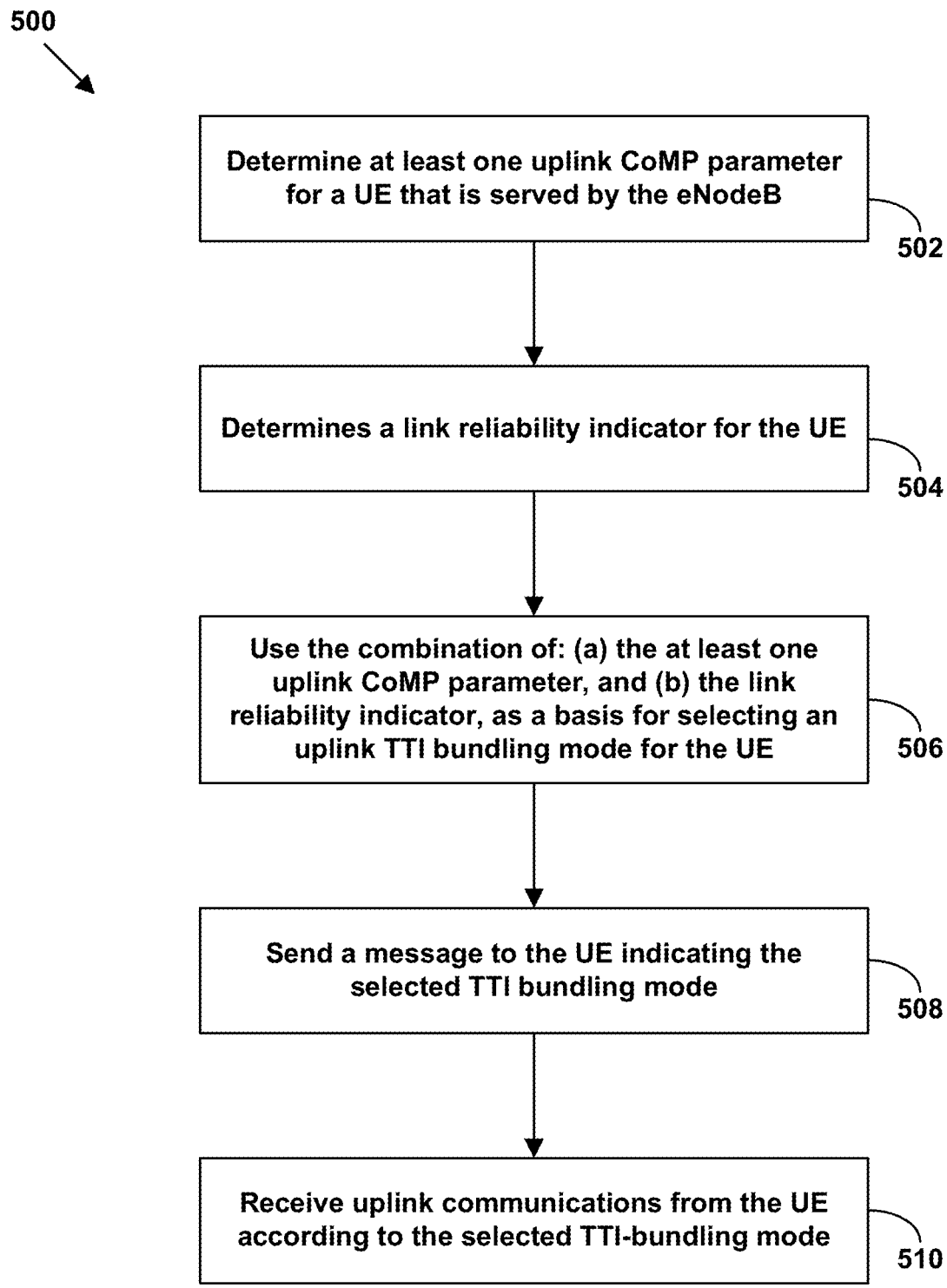
FIG. 5 is flow chart illustrating a method for selecting a TTI bundling mode based on a combination of uplink CoMP status and a link reliability indicator, according to an exemplary embodiment.

In some embodiments, an eNodeB may determine a link reliability indicator for the UE's serving sector, and use a combination of the link reliability indicator and the UE's uplink CoMP status to select the TTI bundling mode for the UE. FIG. 5 is flow chart illustrating a method 500 for selecting a TTI bundling mode based on a combination of uplink CoMP status and a link reliability indicator, according to an exemplary embodiment.

More specifically, as shown by block 502, method 500 involves an eNodeB determining at least one uplink CoMP parameter for a UE that is served by the eNodeB. The eNodeB also determines a link reliability indicator for the UE, as shown by block 504. The eNodeB then uses the combination of: (a) the at least one uplink CoMP parameter, and (b) the link reliability indicator, as a basis for selecting an uplink TTI bundling mode for the UE, as shown by block 506. The eNodeB also sends a message to the UE indicating the selected TTI bundling mode, as shown by block 508. (Note that if the selected TTI bundling mode was already in use by the UE, then block 508 may be omitted.) The eNodeB may then receive uplink communications from the UE according to the selected TTI-bundling mode, as shown by block 510.

At block 502, the uplink CoMP parameter for the UE may be determined in a similar manner as described above in reference to block 402 of method 400. Further, at block 504, various measures may be used as a link reliability indicator for the UE. For example, the eNodeB may determine a measure of uplink and/or downlink signal strength between the eNodeB and the UE. In some embodiments, the eNodeB may use a channel quality indicator (CQI) that is reported to the eNodeB by the UE. The CQI may indicate a modulation scheme and/or a coding scheme that should be used by the eNodeB for downlink communications. Since the modulation scheme and/or a coding scheme may vary according to the downlink channel quality perceived by a UE, the modulation scheme and/or a coding scheme indicated by the CQI may be used as an indication of downlink channel quality. And, since the channel quality of the downlink and corresponding uplink are often similar, the CQI reported by a UE can more generally be used as a channel reliability indicator for both the uplink and downlink between the eNodeB and the reporting UE.

In some embodiments, signal strength and/or CQI values may be categorized into certain predetermined ranges. For example, the signal strength and/or CQI value reported by a given UE may be categorized as a high-quality indication (H), a medium-quality indication (M), or a low-quality indication (L). In such an embodiment, the link quality indicator may simply be indicator of an indication of the particular classification given to the UE's signal strength measure or the CQI value reported by the UE; e.g., "H", "M", or "L." As specific example, of the 15 CQI values currently defined in LTE (i.e., CQI values 1 to 15), CQI values 1 to 5 may be classified as "L", CQI values 6 to 10 may be classified as "M", and), CQI values 11 to 15 may be classified as "H." Other ranges and/or other techniques for measuring and evaluating signal strength are also possible.

At block 506, the eNodeB may use the combination of an uplink CoMP parameter and a link reliability indicator for a particular UE in various ways to select the uplink TTI bundling mode for the UE. As one specific example, FIG. 6 is a table 600 showing a scheme for selecting a TTI bundling mode based on a combination of the number of CoMP links that are coordinating to provide joint processing of a UE's signal and the link reliability indicator.

More specifically, table 600 shows a selection scheme for TTI bundling in a scenario where: (i) up to three sectors can coordinate for joint processing of a UE's uplink signal, (ii) the link-quality indicator indicates either high-quality (H), medium quality (M), or low quality (L), and (iii) the maximum TTI bundling size is 4 slots. In this scenario, column 602a indicates various numbers of CoMP links that can provide uplink CoMP for a UE (i.e., the possible numbers of participating sectors, given the CoMP group serving the UE), and column 604a indicates various link-quality indicators (e.g., H, M, and L) that are possible for UE.

As such, rows 604a to 604h of table 600 show all of the possible combinations of the number of CoMP links and link-quality indicators. Further, in a given row 604a to 604h, columns 602c and 602d collectively show the TTI bundling mode that should be selected, when the eNodeB determines that the number of CoMP links and the link-reliability indicator matches those that are shown in the given row. For example, if an eNodeB is utilizing two sectors to provide joint processing of the uplink signal from a given UE, and the eNodeB also determines that the link-reliability indicator for the given UE is "M," then row 604f indicates that TTI bundling should be enabled with a bundling size of 2 slots. Other examples are also possible.

B. Adjusting Uplink CoMP Based on TTI Bundling Status

Figure 7:
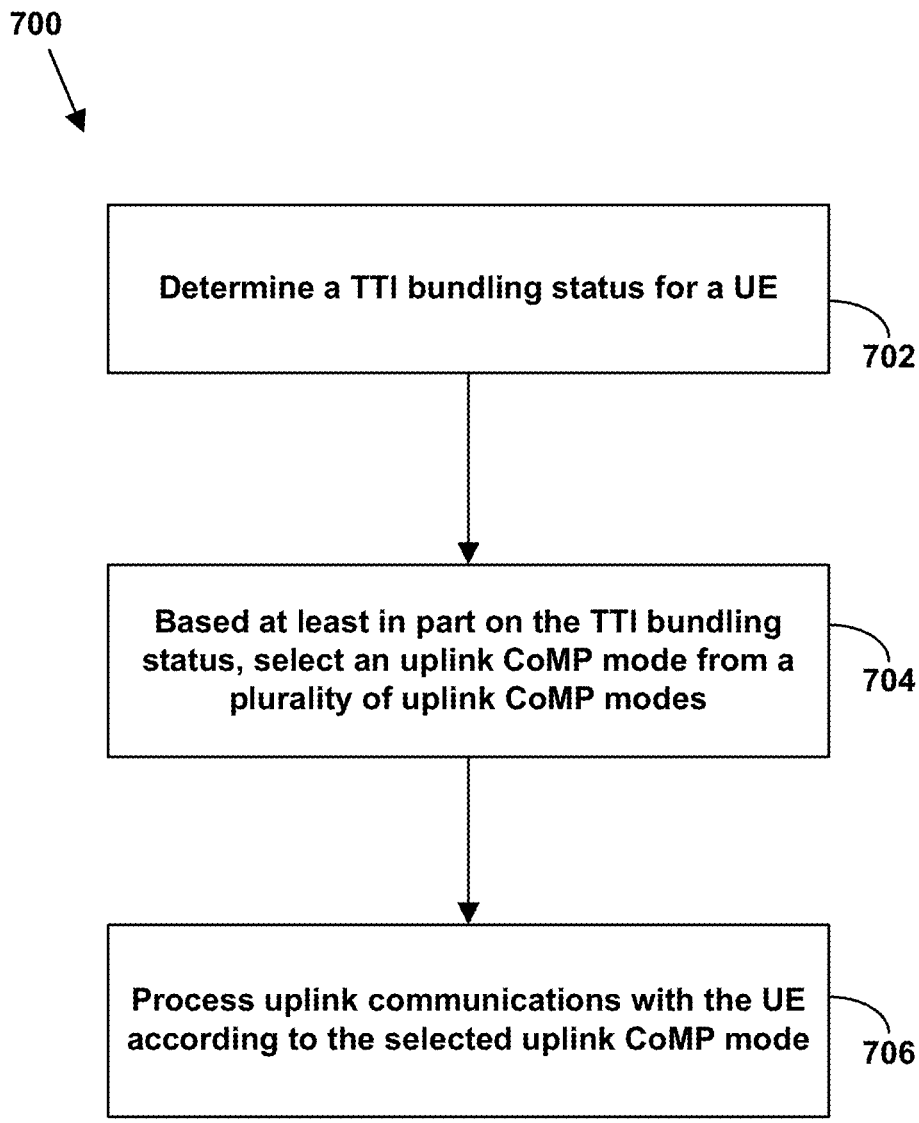
FIG. 7 is flow chart illustrating a method 700 for selecting an uplink CoMP mode, according to an exemplary embodiment.

In some embodiments, TTI bundling status may be evaluated to select an uplink CoMP mode, instead of evaluating uplink CoMP status to select a TTI bundling mode. For example, FIG. 7 is flow chart illustrating a method 700 for selecting an uplink CoMP mode, according to an exemplary embodiment.

More specifically, as shown by block 702, method 700 involves an eNodeB determining a TTI bundling status for a UE that is served by the eNodeB. The TTI bundling status may indicate: (a) whether or not TTI bundling is enabled for the UE, and (b) if enabled, the bundling size for the UE. Other information may additionally or alternatively be included in the TTI bundling status.

Then, based at least in part on the TTI bundling status, the eNodeB may select an uplink CoMP mode from a plurality of uplink CoMP modes, as shown by block 704. The eNodeB may then process uplink communications with the UE according to the selected uplink CoMP mode, as shown by block 706.

In some embodiments, selecting the CoMP made may involve determining whether to enable or disable uplink CoMP for the UE. Further, in some embodiments, selecting the uplink CoMP made may additionally involve determining how many participating sectors should be utilized to provide uplink CoMP for the UE (e.g., how many sectors should be utilized for joint processing of the UE's uplink signal). In such embodiments, the eNodeB may increase the number of participating sectors as the bundling size for TTI bundling decreases. Other techniques for selecting an uplink CoMP mode based on TTI bundling status of a UE are also possible.

VI. CONCLUSION

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

We claim:

1. A method comprising:
    determining, by a base station that is serving a user equipment (UE), an uplink coordinated multipoint (CoMP) status of the UE;
    based at least in part on the uplink CoMP status of the UE, selecting, by the base station, a transmission time interval (TTI)-bundling mode from a plurality of TTI-bundling modes, wherein:
        (a) when the determined uplink CoMP status indicates uplink CoMP is disabled for the UE, a TTI bundling mode having a first bundling size is selected, and
        (b) when the determined uplink CoMP status indicates uplink CoMP is enabled for the UE, TTI bundling is disabled or a TTI bundling mode having a second bundling size less than the first bundling size is selected; and
    receiving, by the base station, an uplink communication from the UE according to the selected TTI-bundling mode.

2. The method of claim 1, further comprising, before receiving the uplink communication according to the selected to TTI, sending an indication of the selected TTI-bundling mode to the UE.

3. The method of claim 1, wherein determining the uplink CoMP status of the UE further comprises determining that the UE is capable of uplink CoMP communication.

4. The method of claim 1, wherein the uplink CoMP status indicates that uplink CoMP is associated with the UE, and wherein selecting the TTI-bundling mode from the plurality of TTI-bundling modes comprises:
    determining one or more uplink CoMP parameters for the UE; and
    selecting the TTI-bundling mode based at least in part on the one or more uplink CoMP parameters.

5. The method of claim 4, wherein the one or more uplink CoMP parameters comprise a number of participating sectors for uplink joint processing for the UE.

6. The method of claim 1, wherein the uplink CoMP status indicates that uplink CoMP is associated with the UE, and wherein selecting the TTI-bundling mode from the plurality of TTI-bundling modes comprises:
    determining at least one uplink CoMP parameter for the UE;
    determining a link reliability indicator for the UE; and
    using both (a) the at least one uplink CoMP parameters for the UE, and (b) the link reliability indicator for the UE, as a basis for selecting the TTI-bundling mode.

7. The method of claim 6, wherein the link reliability indicator comprises a measure of signal strength between the base station and the UE.

8. The method of claim 6, wherein the link reliability indicator comprises a channel quality indicator (CQI) received from the UE.

9. A method comprising:
    determining, by a base station that is serving a user equipment (UE), a transmission time interval (TTI) bundling status for the UE;
    based at least in part on the TTI bundling status, selecting, by the base station, an uplink coordinated multipoint (CoMP) mode from a plurality of uplink CoMP modes, wherein:

(a) when the TTI bundling status indicates a TTI bundling mode having a first bundling size, the selected uplink CoMP mode disables uplink CoMP for the UE, and (b) when the TTI bundling status indicates that TTI bundling is disabled or indicates a TTI bundling mode having a second bundling size less than the first bundling size, the selected uplink CoMP mode enables uplink CoMP for the UE; and processing, by the base station, uplink communications from the UE according to the selected uplink CoMP mode.

10. The method of claim 9, wherein selecting the uplink CoMP mode from the plurality of uplink CoMP modes comprises:

determining, by the base station, one or more TTI bundling parameters for the UE; and selecting the uplink CoMP mode for the UE based at least in part on the one or more TTI bundling parameters for the UE.

11. A system that is configured to provide service in one or more sectors of a wireless communication network, the system comprising:

a communication interface configured to receive an uplink signal from a UE in a first sector of the wireless communication network;

at least one processor; and program instructions stored on a non-transitory computer readable medium and executable by the at least one processor to:

determine an uplink coordinated multipoint (CoMP) status of the UE;

based at least in part on the uplink CoMP status of the UE, select a transmission time interval (TTI)-bundling mode from a plurality of TTI-bundling modes, wherein: (a) when the determined uplink CoMP status indicates uplink CoMP is disabled for the UE, a TTI bundling mode having a first bundling size is selected, and (b) when the determined uplink CoMP status indicates uplink CoMP is enabled for the UE, TTI bundling is disabled or a TTI bundling mode having a second bundling size less than the first bundling size is selected; and operate the communication interface to receive an uplink signal from the UE according to the selected TTI-bundling mode.

12. The system of claim 11, further comprising program instructions stored on a non-transitory computer readable medium and executable by the at least one processor to, before receiving the uplink communication according to the selected to TTI, send an indication of the selected TTI-bundling mode to the UE.

13. The system of claim 11, wherein the uplink CoMP status indicates that uplink CoMP is associated with the UE, and wherein the program instructions stored on the non-transitory computer readable medium and executable by the at least one processor to select the TTI-bundling mode from the plurality of TTI-bundling modes comprise program instructions stored on the non-transitory computer readable medium and executable by the at least one processor to:

determine one or more uplink CoMP parameters for the UE; and select the TTI-bundling mode based at least in part on the one or more uplink CoMP parameters.

14. The system of claim 11, wherein the uplink CoMP status indicates that uplink CoMP is associated with the UE, and wherein the program instructions stored on the non-transitory computer readable medium and executable by the at least one processor to select the TTI-bundling mode from the plurality of TTI-bundling modes comprise program instructions stored on the non-transitory computer readable medium and executable by the at least one processor to:

determine one or more uplink CoMP parameters for the UE;

determine a link reliability indicator for the UE; and use both (a) the one or more uplink CoMP parameters for the UE, and (b) the link reliability indicator for the UE, as a basis to select the TTI-bundling mode.

* * * * *